(12) United States Patent
Di Noi

(10) Patent No.: US 10,376,832 B2
(45) Date of Patent: Aug. 13, 2019

(54) FILTERING DEVICE FOR DUST AND OTHER POLLUTANTS

(71) Applicants: Rocco Rizzo, Taranto (IT); Angelo Di Noi, Francavilla Fontana (IT)

(72) Inventor: Angelo Di Noi, Francavilla Fontana (IT)

(73) Assignee: Rocco Rizzo, Taranto (IT)

( * ) Notice: Subject to any disclaimer, the term of this patent is extended or adjusted under 35 U.S.C. 154(b) by 51 days.

(21) Appl. No.: 15/507,356

(22) PCT Filed: Sep. 1, 2015

(86) PCT No.: PCT/IB2015/056638
§ 371 (c)(1),
(2) Date: Feb. 28, 2017

(87) PCT Pub. No.: WO2016/035013
PCT Pub. Date: Mar. 10, 2016

(65) Prior Publication Data
US 2017/0291136 A1   Oct. 12, 2017

(30) Foreign Application Priority Data

Sep. 2, 2014 (IT) .............................. BR2014A0005

(51) Int. Cl.
*B01D 45/16*  (2006.01)
*B01D 53/34*  (2006.01)
*B01D 53/50*  (2006.01)
*B01D 53/56*  (2006.01)
*B01D 53/70*  (2006.01)
*B01D 53/79*  (2006.01)
*B01D 47/06*  (2006.01)
*B01D 47/10*  (2006.01)

(52) U.S. Cl.
CPC ............ *B01D 53/34* (2013.01); *B01D 45/16* (2013.01); *B01D 53/50* (2013.01); *B01D 53/56* (2013.01); *B01D 53/70* (2013.01); *B01D 53/79* (2013.01); *B01D 47/06* (2013.01); *B01D 47/10* (2013.01)

(58) Field of Classification Search
CPC ................................ B01D 45/12; B01D 45/16
USPC ................................ 55/434, 447, 456, 459.3
See application file for complete search history.

(56) References Cited

U.S. PATENT DOCUMENTS

| 1,306,003 A | * | 6/1919 | Good | ..................... | B01D 45/16 |
| | | | | | 237/68 |
| 1,958,577 A | | 5/1934 | Hirshfeld | | |
| | | | (Continued) | | |

FOREIGN PATENT DOCUMENTS

| DE | 102004039182 A1 | 2/2006 |
| FR | 1024439 A | 4/1953 |
| | (Continued) | |

OTHER PUBLICATIONS

International Search Report and Written Opinion for International Application No. PCT/IB2015/056638 (dated Dec. 18, 2015) (10 Pages).

*Primary Examiner* — Robert A Hopkins
(74) *Attorney, Agent, or Firm* — Lucas & Mercanti, LLP

(57) ABSTRACT

The present invention relates to the filtering of fumes emitted by industrial processes such as those used in iron and steel works, refineries, waste-to-energy plants and the like and in particular relates to a filtering device for fine and ultrafine dust particles and other polluting agents.

11 Claims, 3 Drawing Sheets

(56) References Cited

U.S. PATENT DOCUMENTS

| 3,348,830 | A | 10/1967 | Pearl et al. |
|---|---|---|---|
| 2008/0250933 | A1 | 10/2008 | Yun |
| 2014/0238239 | A1 | 8/2014 | Abayev et al. |

FOREIGN PATENT DOCUMENTS

| FR | 2630658 | A1 | 11/1989 |
|---|---|---|---|
| KR | 20020044845 | A | 6/2002 |
| WO | 8800610 | A1 | 1/1988 |
| WO | 0006289 | A1 | 2/2000 |
| WO | 0216006 | A1 | 2/2002 |
| WO | 2009087100 | A1 | 7/2009 |
| WO | 2009155974 | A1 | 12/2009 |

\* cited by examiner

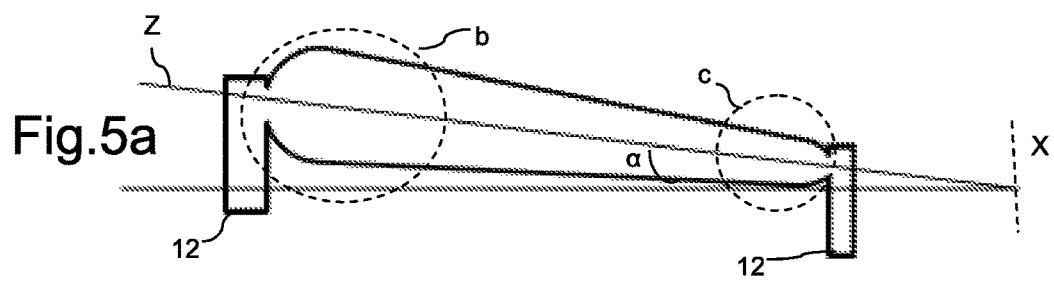
Fig.5a
Fig.5b
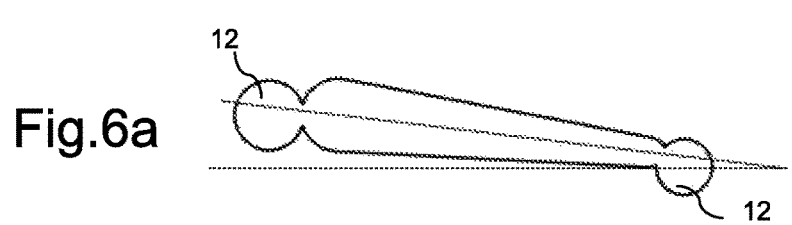
Fig.6a
Fig.6b
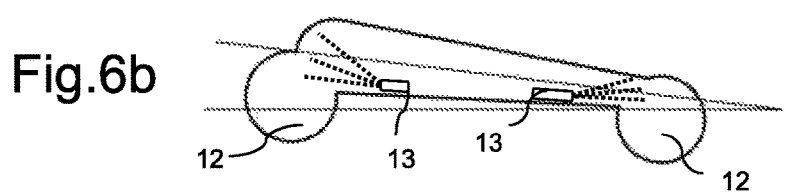
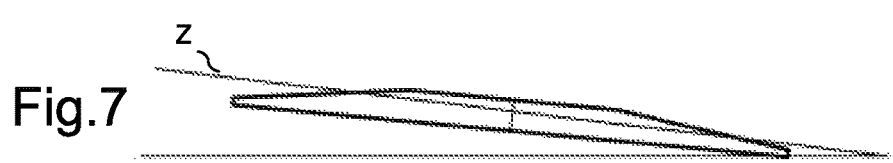
Fig.7
Fig.8

FILTERING DEVICE FOR DUST AND OTHER POLLUTANTS

CROSS-REFERENCE TO RELATED APPLICATIONS

This application is a 371 of PCT/IB2015/056638, filed Sep. 1, 2015, which claims the benefit of Italian Patent Application No. BR2014A000005, filed Sep. 2, 2014.

TECHNICAL FIELD OF THE INVENTION

The present invention relates to the sector dealing with the filtering of fumes emitted by industrial processes (such as those used in iron and steel works, refineries, waste-to-energy plants and the like) and in particular relates to a filtering device for fine and ultrafine dust particles and other polluting agents.

BACKGROUND OF THE INVENTION

As is known, the working processes commonly used in industrial plants such as iron and steel works, refineries, waste-to-energy plants and the like produce fumes which contain toxic, pathogenic and/or polluting agents such as particulate matter, dioxins, furans, polychlorobiphenyls, chlorophenoxy compounds, nitrogen oxides or dioxides, sulphur dioxide, etc.

In general, particulate matter, anhydrides and nitrogen monoxides and dioxides are irritants for the respiratory systems, causing in human beings respiratory illnesses and diseases such as asthma, bronchitis and infections of the respiratory tracts. Moreover, particulate matter, in particular ultrafine dust particles, may convey pollutants also into the pulmonary alveoli.

The systems for filtering fumes which are currently known consist for example of electrofilters, bag filters, cyclone dust separators, hydraulic dust separators, active carbons, etc.

These systems, however, have a series of drawbacks. For example, they require frequent periodic maintenance and therefore have high maintenance costs. Moreover, they are subject to malfunctions due to the significant pressure losses.

Furthermore, the known systems have not insignificant limitations of a physical and mechanical nature. For example, bag filters perform filtering by means of micro-perforated bags capable of retaining dust particles with a diameter greater than that of the holes. However, these filters allow dust particles with a diameter smaller than that of the holes to pass through. If the diameter of the holes were too small, there would be problems with the air flow. Therefore, these filters are not suitable for retaining in an efficient manner ultrafine dust particles, with a diameter of less than 5 microns.

Many of these systems are also not compatible with high temperatures, are adversely affected by the presence of moisture (bag filters) and sometimes have a very limited efficiency as regards filtering of particulate matter (conventional cyclones). Almost always they consist of systems which have exclusively a very limited dedusting capacity for fumes (are ineffective for eliminating ultrafine particles with a diameter of less than 5 $\mu$m) and are unsuitable for removal of the pollutants except where costly plasma thermal destruction systems are used with subsequent washing and drying of the fumes.

Examples of known systems such as those described are contained in the publications KR20020044845, WO2009087100, WO8800610A1 and WO0006289.

Other systems are also known from the documents US2014/238239, DE102004039182, FR1024439, WO2009155974, US2008250933 and U.S. Pat. No. 3,348,830. These systems are substantially conventional cyclones, namely they have a form extending spirally around an axis of extension along which the fumes flow. The fumes, travelling along the cyclone, are subject to centrifugal forces which push the solid particles contained therein towards the outer walls of said cyclone. Moreover, the configurations of the ducts in these systems do not have the necessary characteristics for creating vacuum effects useful for removal of the particulate matter.

When the particles strike the walls they are separated from the stream of fumes and collected. These systems have the drawbacks described above. Moreover, as already mentioned, they are unsuitable for the removal of fine dust particles with a diameter of less than 10 $\mu$m (microns).

SUMMARY OF THE INVENTION

The object of the present invention is to overcome the drawbacks described above and in particular to provide a device which is able to obtain an efficient purification of the fumes with low construction and management costs.

Moreover, it is also an object of the device according to the invention to enable also the removal of extremely fine dust particles, with a diameter of less than 5 $\mu$m.

These results are achieved by the device for filtering fine and ultrafine dust particles and other polluting agents according to the present invention, the essential characteristic features of which are respectively described in the independent claim 1. Further important characteristic features are also described in the dependent claims.

BRIEF DESCRIPTION OF THE DRAWINGS

The characteristic features and advantages of the device according to the present invention will emerge clearly from the following detailed description of preferred embodiments thereof, provided by way of a non-limiting example, with reference to the accompanying figures in which:

FIGS. 5a and 5b show a first variation of embodiment of the duct, again in a cross-sectional view, the blowing means being shown in FIG. 5b;

FIGS. 6a and 6b show a second variation of embodiment of the duct, the blowing means being again shown in FIG. 6b;

FIG. 7 is a further third variation of embodiment of the duct;

FIG. 8 is a fourth and last variation of embodiment of the duct.

DETAILED DESCRIPTION OF THE INVENTION

With reference to the aforementioned figures, the device comprises a substantially spiral duct 1 which extends spirally around a vertical axis or generatrix X in the form of superimposed volutes 1a. The generatrix also defines the direction of advancing movement of the fumes from an inlet mouth (not shown) to an outlet mouth 10 of said spiral.

Figure 1:
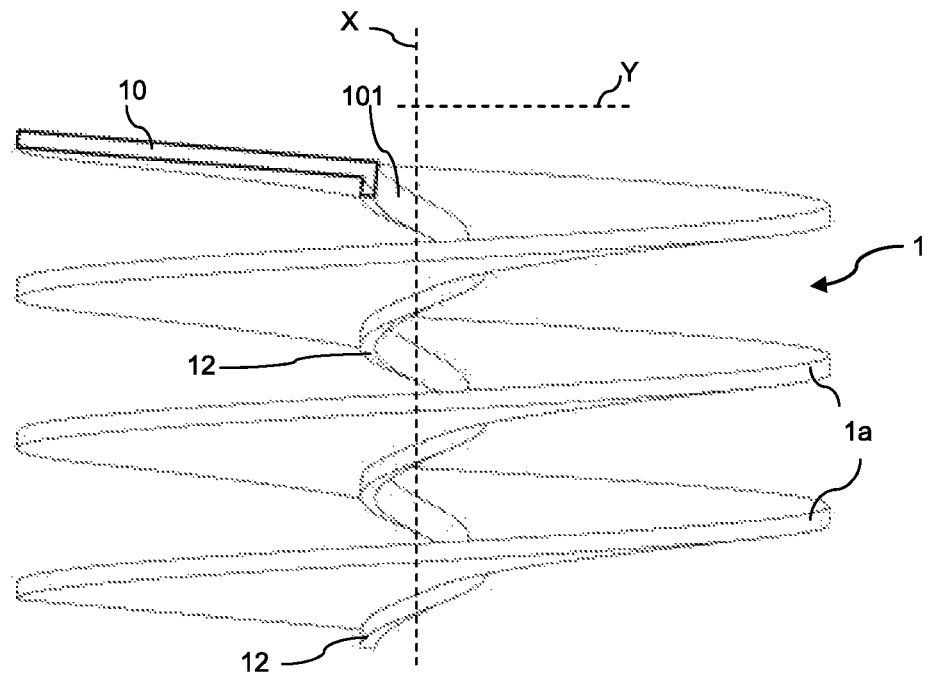
FIG. 1 is an overall view of the device according to the invention.
Figure 2:
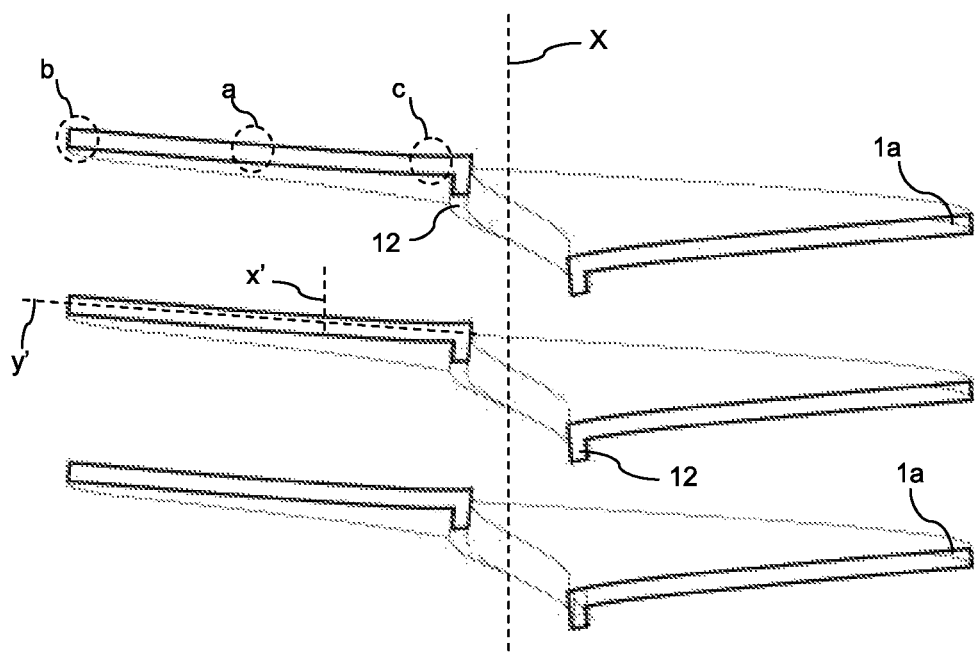
FIG. 2 is an axial section through the device according to FIG. 1.

In even greater detail and with reference in particular to FIG. 2, the inlet mouth and the outlet mouth are arranged in an operational continuous manner in relation to the spiral.

The filter is arranged vertically, namely the inlet mouth and outlet mouth are arranged mutually superimposed along the generatrix. Optionally, the outlet mouth and the inlet mouth may be inverted, namely the flow of the fumes may travel equally well along the spiral upwards (in this case the inlet mouth is arranged at a height lower than that of the outlet mouth) or downwards (in this case the inlet mouth is at greater height than the outlet mouth).

In a preferred embodiment, the spiral duct has a constant cross-section along its entire extension. The cross-section is the generating section, namely that which extending along the axis X determines the geometry of the filter.

In greater detail, each volute has a flattened cross-section, namely has one dimension greater than the other one. Said greater dimension y is that measured along a transverse direction Y substantially perpendicular to the generatrix X. The smaller dimension x is instead measured along the generatrix X; in particular, in the case of non-rectangular cross-sections, the smaller dimension is calculated at the intermediate point between the maximum height and the minimum height of the duct.

Therefore, essentially, the spiral duct extends developing (still with reference to the larger dimension of the cross-section) in a position perpendicular to the generating axis X.

In general the minimum ratio of the cross-section of the volute of the duct is 5, namely the maximum dimension is art least five times the minimum dimension.

Inside the filter, the fumes, owing to the spiral form of the duct and the flattened cross-section, are subject to velocity gradients. In particular, the velocity is inversely proportional to the distance from the generatrix, namely from the radius of the path travelled. These differences in velocity, based on Bernoulli's principle, create localized vacuums in the higher velocity zone, namely in the innermost zone of the filter closest to the generatrix. In this zone, indicated in FIG. 2 by the letter "c", the smaller-diameter particles are collected, these being, precisely because of the vacuum effect, separated from the stream of fumes. In particular, particles with diameters smaller than 100 microns are collected.

The larger particles, instead, which have a diameter size greater than or equal to 100 microns and which, owing to their size are subject to the centrifugal force, are collected in the outermost zone of the filter, namely that zone which is furthest from the generatrix and indicated by the letter "b" in FIG. 2. The central zone, which is indicated by the letter "a", is that where the purified fumes flow together.

Preferably, but not exclusively, the optimum vacuum value in the zone "c" is less than −70 Pascal. In order to obtain this vacuum value, the ratio between the cross-sectional dimensions, namely between the maximum dimension and the minimum dimension, is preferably greater than or equal to 5. In a preferred embodiment, this value is equal to 10.

Furthermore, the air stream which flows along the filter travels preferably at a speed of between 10 and 25 m/s.

Advantageously, each volute may be inclined with respect to the generatrix X. In detail, with specific reference to FIGS. 5a to 8, the central axis Z of the cross-section of the duct may be inclined positively or negatively at an angle α with respect to the transverse direction Y. Preferably, but not exclusively, this angle is between 5 degrees and 12 degrees. The optimum value is preferably, but not exclusively, 10 degrees. This inclination is particularly advantageous if the fumes to be treated are particularly hot (temperature higher than about 80° C.) or cold (temperature lower than about 40° C.). In fact, where high-temperature fumes are present, the air masses tend to move towards the highest portion of the duct, while if cold air fumes are present, these tend to move towards the lower portion of the duct. This helps ensure removal of the polluting agents; in fact, in addition to the vacuum effect, the movement of the air flow is also used in order to direct the fumes and therefore the pollutants towards the outer or inner portions of the duct, namely those zones under a vacuum where filtering is performed.

Among the advantages due to inclination of the duct there is also the easier elimination, by means of percolation, of any sediments resulting from the passage of the particulate matter.

With reference now to FIGS. 5a to 8, these show further variations of embodiment of the duct and in particular of the cross-section. In greater detail, the duct may have a non-constant or square variable cross-section, while maintaining the aforementioned proportions (the main dimension at least double the smaller dimension).

With a view to increasing the efficiency of the filter, the duct is provided internally with blowing means 13 such as atomizer nozzles which emit pressurized jets (of liquids or gas) so as to help propel the polluting dust particles in the appropriate direction. For example, the jets may consist of water or liquid solutions capable of attacking also chemically the various pollutants present in the fumes, therefore also helping remove them by chemical means.

The nozzles are arranged inside the duct close to the central axis and, preferably in an inclined condition, so as to emit the jet in a direction favourable for the flow. Preferably, but not exclusively, the jets are inclined at between 45 degrees and 90 degrees with respect to the central axis of the cross-section.

Figure 3:
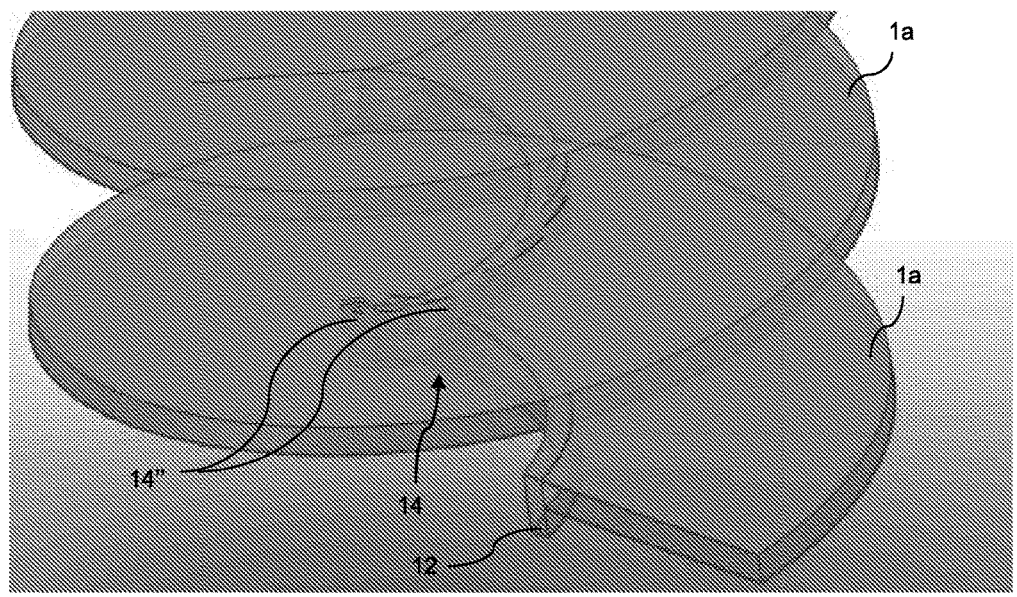
FIG. 3 shows a transparent view of the device where means for separating a chamber for storing collected dust particles and a filtering section are visible.
Figure 4:
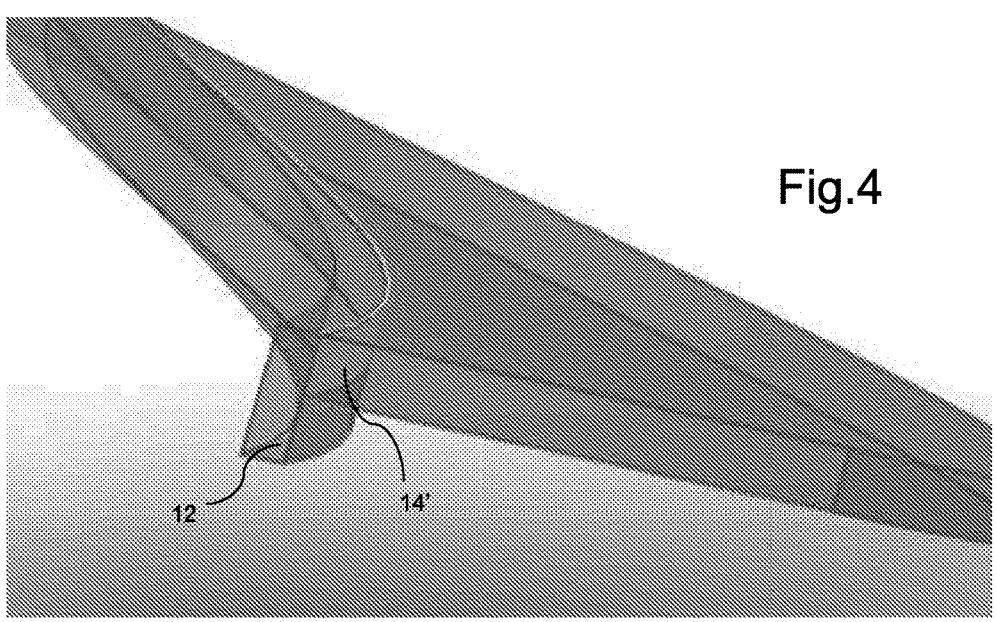
FIG. 4 is a larger-scale view of FIG. 3.

Again with reference to FIGS. 3 and 4, one or both the ends of the duct may be provided with collection chambers 12 for the polluting agents separated from the stream of fumes. The chambers take the form, for example, of one or more pipes which travel around the spiral and which have a volume equal to or less then that of the cross-section of said spiral.

Water or other solvents are advantageously circulated inside these chambers in order to favour the removal of the polluting agents collected. The collection chambers also have vents (not shown) which are connected directly or via a dust-particle storage tank to the filter inlet, so that the dust particles are not discharged into the atmosphere and any pollutants contained in the vented gases are in turn eliminated during a second passage through the filter.

The collection chambers 12 may have inside them (mechanical or Venturi effect) aspirators which operate so as to generate inside the chamber a vacuum and help draw off the pollutants and confine them inside said collection chamber.

In order to separate each collection chamber from the duct section, separation means 14, such as a flat dividing wall 14' or vanes 14" arranged with their concave surface directed towards the generatrix, are provided. Optionally one or both of the separation means may be provided inside the filter, at different heights.

The device according to the present invention solves the aforementioned problems. In particular, the device ensures the effective filtering also of fine and ultrafine particles, with dimensions smaller than 5 microns, which could not be filtered by the conventional cyclone filters based on the action of the centrifugal force.

Furthermore, particularly advantageous is the fact that the device achieves separate filtering of fine and ultrafine particles and larger particles, greater than 100 microns. As mentioned above, the fine and ultrafine particles are collected in the part of the duct closest to the generatrix, namely the centre of the spiral, while the larger particles are collected on the outside, on the part of the duct furthest from the generatrix. Therefore, it is possible to collect these particles separately and this is particularly advantageous for the purposes of easy disposal of the waste matter. In fact, the dust particles, once concentrated, may be made to flow inside a storage tank and may therefore be able to be immediately removed so that they can be introduced again into a possible production cycle, namely so that they may be used, via suitable conversion processes, as inert material or insulants.

Furthermore, the fact that the vents of the collection chambers 12 are connected back to the filter so as to cause the recirculation of the fumes at least a second time gives rise to significant advantages as regards both the efficiency of collection of the pollutants and prevention of the emission of potentially toxic fumes into the atmosphere.

Optionally, the filter according to the invention may be used, with suitable dimensions, also as a filtering unit in vacuum cleaners for civil and industrial uses.

Furthermore, in some embodiments, a volute may optionally have a cross-section which is different from the following volute. Also in the case where the volutes have cross-sections different from each other the minimum ratio of 5 between maximum dimension and minimum dimension must nevertheless be maintained.

Finally, the filter may also have two or more ducts arranged on top of each along their spiral path so as to obtain the simultaneous filtering of different streams of fumes.

The present invention has been described hitherto with reference to preferred embodiments thereof. It is to be understood that each of the technical solutions implemented in the preferred embodiments described here by way of example may be advantageously combined in various ways with each other, so as to give rise to other embodiments which relate to the same inventive idea, but all falling within the scope of protection of the claims provided hereinbelow.

The invention claimed is:

1. A device for filtering dust particles or other polluting agents in an air flow, said device comprising
    a spiral duct which extends in the form of superimposed volutes around a vertical generatrix (X),
    said duct extending between an inlet mouth and an outlet mouth for said air flow,
    wherein each volute of said duct has a cross-section with a dimension (y), measured along an axis (Y) perpendicular to said generatrix (X), that is at least five times greater than a dimension (x), measured with respect to said generatrix (X), so as to obtain in zones of said duct a vacuum effect to separate and remove the dust particles or other polluting agents from said air flow and convey the finer dust particles in the direction of the generatrix (X).

2. The device according to claim 1, wherein said ratio of said dimension (y) to dimension (x) is equal to 10.

3. The device according to claim 1, wherein each of said volutes is inclined positively or negatively at a angle ($\alpha$) with respect to a direction perpendicular to said generatrix (X).

4. The device according to claim 3, wherein said angle is between 5 degrees and 12 degrees.

5. The device according to claim 1, wherein a collection chamber for collecting said dust particles or other polluting agents is associated with each of said volutes, at least one diametral end of said cross-section.

6. The device according to claim 5, where both the diametral ends of said cross-section have a respective collection chamber.

7. The device according to claim 5, wherein said collection chamber has a vent connected directly or via a dust-particle storage tank to said inlet of said filter so that the fumes contained inside said chamber are processed again.

8. The device according to claim 5, wherein aspirators operate inside said collection chamber so as to generate inside said chamber a vacuum such as to help draw off the pollutants and confine them inside said collection chamber.

9. The device according to claim 8, wherein separation means are provided to separate said collection chamber and said duct, and to prevent the return of the fumes and the polluting dust particles from the said chamber to said duct.

10. The device according to claim 5, wherein water or other solvents are circulated inside each of said collection chambers in order to favour the removal of the polluting agents collected.

11. The device according to claim 1, wherein blowing means able to emit a pressurized jet of air or water or other fluid are provided inside each volute so as to help propel the dust particles or polluting agents in the appropriate direction and perform chemical removal thereof.

* * * * *